Feb. 26, 1957 T. A. JACKSON 2,782,704
IMPLEMENT ATTACHING MEANS FOR TRACTORS
Filed Aug. 29, 1951 3 Sheets-Sheet 1

INVENTOR.
TRUMAN A. JACKSON
BY
Emerson B Donnell
ATT.

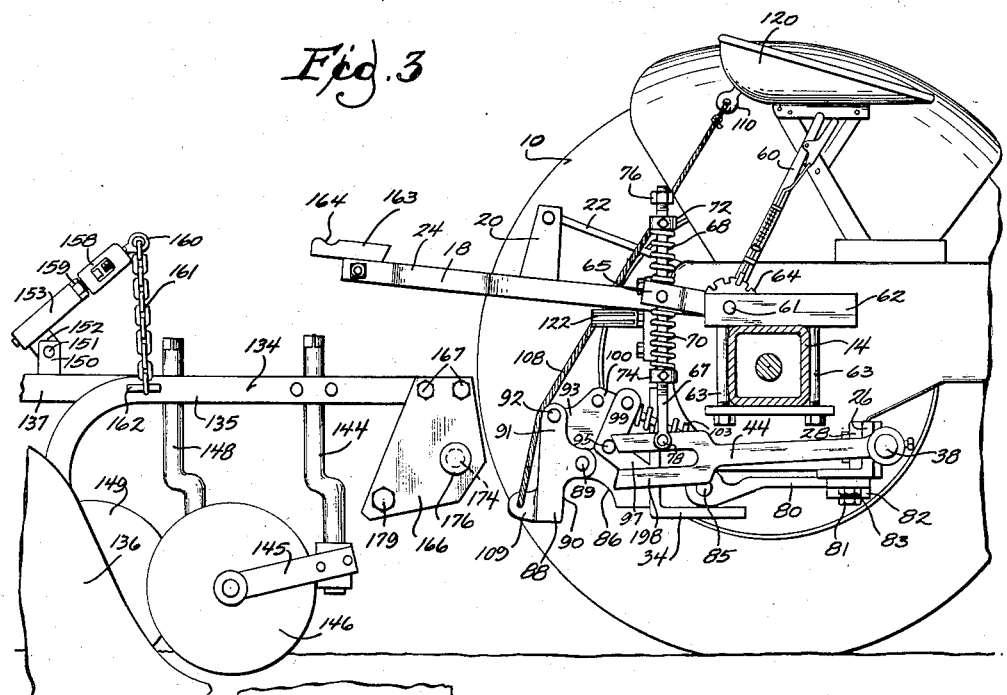

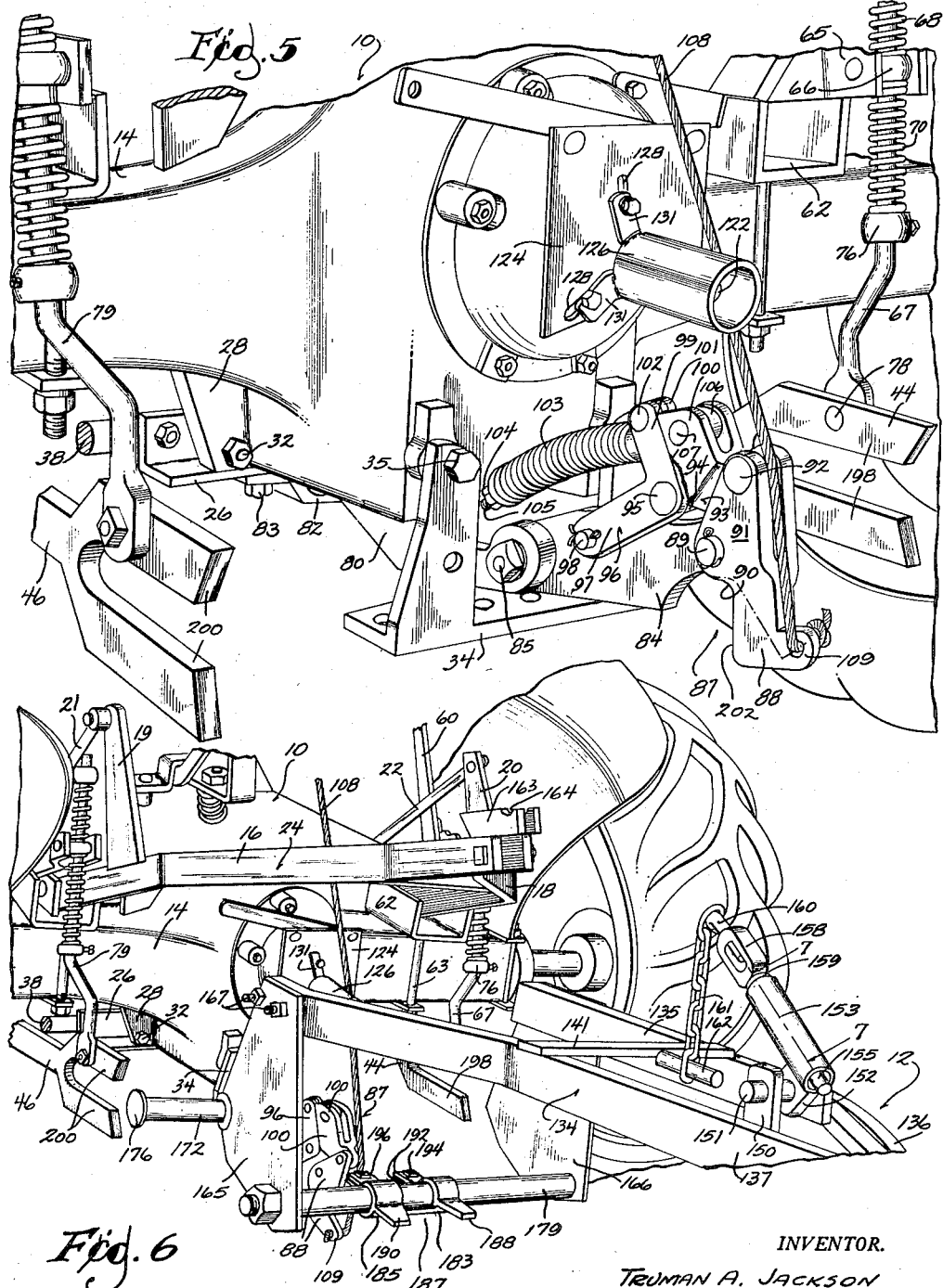

United States Patent Office 2,782,704
Patented Feb. 26, 1957

2,782,704
IMPLEMENT ATTACHING MEANS FOR TRACTORS

Truman A. Jackson, McHenry, Ky.

Application August 29, 1951, Serial No. 244,207

3 Claims. (Cl. 97—47.14)

This invention relates to improvements in farm implements and, specifically, to an arrangement of structural elements which includes attachments on the tractor, the implement to be coupled with the tractor, and a coupling device operatively connected between the tractor and the implements or implement, and an object thereof is to generally improve the construction and operation of devices of this class.

A further object of this invention is to couple and uncouple an implement with a tractor of substantially conventional description and to retain the implement attached to the tractor until such time that the implement strikes an impediment, as a heavy rock, whereby the implement will automatically become released so that there will be no damage to the implement.

Another object of this invention is to so attach the implement by the medium of the improved attaching assembly that the implement may be raised and lowered in accordance with selected depths of cut to be taken in the soil and retained in the selected raised and lowered condition.

A further object of this invention is to raise the implement through the medium of the usual lift arm or arms of the tractor so that it is lifted to the inoperative condition for various purposes, as transporting the implement from one locality to another.

A further object of this invention is to render the coupling and uncoupling of an implement with a tractor easy, rapid and effective.

More specifically the invention relates to the mounting of a plow on a tractor, and a further object is to provide a plow which is mounted on a tractor so as to be carried thereby from place to place, lowered into the ground when desired and pulled by the tractor when so lowered, and which, nevertheless, is automatically released from the tractor if it encounters an obstruction.

Further objects are to provide a plow of the above character which is free to float and find its own depth; such a plow in which the depth it will seek is readily and quickly adjustable; which will plow efficiently in a curved path as in contour farming; and which will release from the tractor if inadvertently turned in too sharp a curve.

Further objects and advantages will become apparent from the following specification and annexed drawings in which a satisfactory embodiment is shown but it is to be understood that the invention is not intended to be taken as limited to the exact construction illustrated, or in fact in any manner except as herein set forth.

In the drawings:

Figure 3 is a sectional view similar to that shown in Figure 2, the implement, however, being uncoupled from the tractor;

Figure 4 is a rear view of the device shown in Fig. 1;

Figure 5 is an enlarged fragmentary perspective view of a part of the tractor and some of elements which attach to the tractor; and Figure 6 is a fragmentary perspective view of the tractor and elements attached thereto in addition to those shown in Figure 5.

Fig. 7 is a sectional view on the line 7—7 of Fig. 6.

Figure 1:
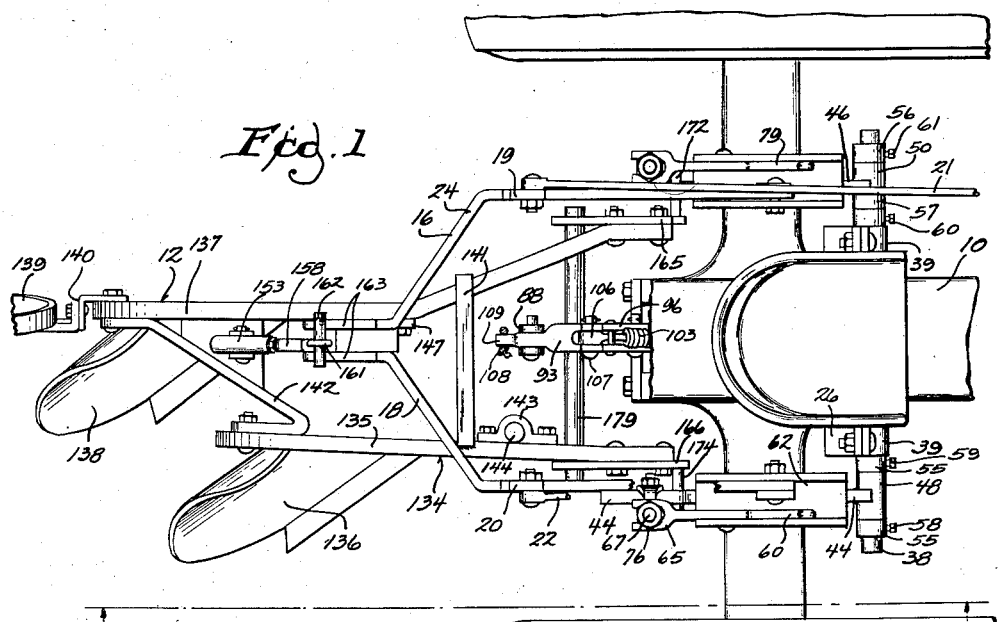
Figure 1 is a plan view of an implement embodying the invention and coupled with a fragmentary part of a tractor.

The invention is illustrated as embodied in a plow, which is mounted on a tractor 10 for carrying it and also for propelling it when in operation, the implement being generally designated as 12. The tractor includes the usual rear axle housing 14 and a lift arm comprising a pair of members 16 and 18 having upstanding bracket-like members 19 and 20 respectively, pivotally connected to actuating rods 21 and 22, the lift arm being generally designated as 24. A transverse attaching bracket 26 is attached to depending ears 28 and 30 at the front of axle portion 14 of the tractor as by bolt and nut assemblies 32—32, while a second bracket, guide or quadrant 34 is attached at the rear of axle housing 14 by means of bolts 35—35. Hence, brackets 26 and 34 are spaced from each other in the present instance to the extent of the width of the axle housing. A cross shaft 38 is fixed to bracket 26 by means of clamps 39. Shaft 38 is for the purpose of supporting and guiding a pair of forked arms, levers or plow influencing means generally designated as 44 and 46 provided rspectively with bearing portions 48 and 50 journaled on shaft 38 and restrained against axial movement thereon by collars 54—55 and 56—57, having set screws 58—59—60 and 61 or otherwise fixed axially of shaft 38 in well-known manner. Arms 46 and 44 are thus free to swing up and down but not to shift axially of shaft 38; in other words laterally of the tractor.

As seen in Fig. 3, an upwardly extending lever 60 is pivoted on a pin 61 to a clamp 62 fastened to axle housing 14 by means of clamping bolts 63—63, said lever being maintained in adjusted position by a quadrant and latch arrangement of well-known form generally designated as 64 and having a rearwardly extending bifurcated arm 65 having trunnioned therein an apertured collar 66. An operating rod 67 extends through collar 66 and has an upper spring 68 and a lower spring 70 arranged concentrically thereon and engaging respectively above and below collar 66, a collar 72 being adjustably fixed on rod 67 above spring 68 and a preferably similar collar 74 being fixed to rod 67 below spring 70. An adjustable upper limit collar 76, in the present instance in the form of a nut is fixed on the upper end of rod 67 to prevent inadvertent removal of collar 72, the whole constituting adjusting mechanism for the influencing means 44 and 46.

It will now be apparent that adjustment of lever 60 will cause up-and-down adjustment of rod 67, collars 72 and 74 being adjusted to place springs 68 and 70 under predetermined compression so that rod 67 is floatingly supported or urged up or down in accordance with the adjustment of lever 60 and arm 65.

The lower end of rod 67 is pivoted, as by a pin, bolt or the like 78, to a portion of forked arm 44 so that the latter partakes of such floating movement and is urged up or down at will by suitable adjustment of lever 60. Substantially identical mechanism including a lever 79 is associated with arm 46 and operates in a similar manner.

A structural member or short drawbar 80 is secured by a bolt 81 passing in the present instance through member 80 and a bail or anchorage 82 secured on bracket 26 as by cap screws or the like 83. Member 80 in the present instance is bifurcated and has a link portion 84 pivotally secured thereto as by a bolt 85 for up-and-down swinging movement and normally resting on above-mentioned guide 34. Link 84 has a cut-away portion 86 (Fig. 3) for engagement with a cross bar to be later described and also a keeper or overload releasing coupling device generally designated as 87. Keeper 87 is generally in the form of a vertical lever 88 pivoted on a pin 89 carried on link portion 84 and cut-away at 90 to cooperate with above-mentioned cut-away portion 86 to form a pocket to retain the above-mentioned cross bar. Lever portion 88 has an upwardly bifurcated arm 91 extending above pivot 89 and connected by a pivot or pin 92 with a toggle element generally designated as 93. Element 93 has a tongue portion 94 pivoted on a pin 95 to a bell crank generally designated as 96 and having a leg 97 lying alongside of above-mentioned link element 84 and pivoted thereto on a pin 98. Bell crank 96 also has an upstanding leg 99 normally pressed against an upstanding bifurcated portion 100 of above-mentioned toggle portion 93. A substantially identical bell crank 101 lies alongside of link portion 84 on the opposite side thereof from bell crank 96 and is connected therewith by above-mentioned pins 95 and 98, and by a pin, rivet or the like 102 so that the two act as a single unit and constitute in connection with element 93, a toggle arrangement. It is to be noted that pin 95, in the present instance is upwardly displaced from the common plane of pins 92 and 98 so that compressive stress in element 93 and leg 97 will give rise to a tendency toward upward movement in pin 95—in other words to "break the toggle." Pin 95 is prevented from ever reaching a position in line with pins 92 and 98 by contact of leg 99 with portion 100, these latter being so proportioned as to maintain a slight upward displacement of pin 95 from alignment with pins 92 and 98.

The parts are normally maintained in this position by means of a spring 103 compressed between a nut 104 on a rod 105 passing between above-mentioned bell cranks 96 and 101 and leg 99 of bell crank 96 and the corresponding leg of bell crank 101. Rod 105 has an eye or loop portion 106 journaled on a pin 107 within bifurcated portion 100 of toggle element 93. It will now be apparent that the pressure of spring 103 not only will press leg 99 generally to the right as seen in Fig. 5 but also, through rod 105, and pin 107, will pull portion 100 to the left, so that leg 99 and portion 100 are urged tightly, although yieldably together.

It will now be apparent that any tendency toward clockwise rotation of keeper 87, from causes to be presently explained, will cause compressive stress in the toggle comprising elements 93 and 97 together with an upward tendency in pin 95 and separation of portions 99 and 100. This latter tendency is resisted by spring 103, and, since the normal position of pin 95 is nearly (but not quite) in line with pins 92 and 98, the upward force is only a small fraction of whatever turning force is exerted on keeper 87. However, it will also be apparent that sufficient force could be exerted on keeper 87 that the upward tendency and consequent tendency to separate, of portions 99 and 100, would be sufficient to further compress spring 103, and that even slight movement would so increase the angle between pins 92, 95 and 98 as to entirely change the resistance characteristics of the arrangement so that further displacement could be effected even with a reduced force. This characteristic is utilized to release the implement, as will be further explained, without damage, in the event it encounters an obstruction which is immovable, or so resistant as to be likely to damage the equipment.

Link 84 and its attached parts is swingable up-and-down about pin 85 for engagement with and disengagement from the above-mentioned cross bar, and a rope 108 is secured to an ear 109 on keeper 87 and by which the assemblage may be lifted at any time by the tractor operator, the upper end of the rope being fastened within convenient reach, for example on a hook 110 carried by the tractor seat 120.

In order to protect the power take-off shaft 122 and to protect other elements such as an operator's clothing from striking the shaft and possibly becoming entangled therewith, a plate 124 is secured to the rear of the power take-off of the tractor and has a sleeve 126 secured thereto which is arranged in enclosing relation with shaft 122. Slots 128 are provided in plate 124 in order to accommodate bolts passing through ears 131 secured to sleeve 126.

Referring now to implement 12, this is shown as a plow and the expedients so far described and to be described are particularly adapted to the propelling, controlling, and carrying in transport position on the tractor, of such a plow, while at the same time providing for the release thereof from the tractor if the plow encounters an obstruction. The invention however, of course contemplates the use of any analogous or other implement which would be adaptable to or benefit from these expedients. The implement has a frame generally designated as 134 comprising for the most part a beam 135 carrying a plow bottom 136 and a beam 137 carrying a plow bottom 138, these plow bottoms being of any suitable or usual form, and a furrow or tail wheel 139 of suitable or well-known type secured to beam 137 by means of an adjustable bracket 140. Frame 134 also includes a cross brace 141 and a diagonal brace 142, both suitably fixed between beams 135 and 137 so as to determine and maintain predetermined spacing between them. A clamping bracket 143 fixed to beam 135 carries a standard 144 having a yoke 145 for a coulter 146 which operates in well-known maner for well-known purposes. A similar clamping bracket 147 carries a standard 148 for a substantially identical coulter 149, these coulters serving respectively plow bottoms 136 and 138. The assemblage just described constitutes a form of two-bottom one-way plow.

Returning to the lifting mechanism 24, this is connected to the plow by flexible means, an upstanding bracket 150 having a pivot pin 151, which passes through an ear 152 fixed to a tubular housing 153 having an inturned shoulder 154, and through which is slidable a rod 155 provided with a centering shoulder 156, a spring 157 surrounding rod 155 within housing 153 and bearing against shoulders 154 and 156. It will be apparent that housing 152 may be swung about pivot 151 and that when swung so that rod 155 is upwardly disposed, an upward pull on rod 155 will cause lifting of plow frame 134, the action being cushioned by more or less compression of spring 157. A turnbuckle 158 is secured to rod 155, preferably adjustable therealong and secured by a lock-nut 159 while an eye-bolt or the like 160 is threaded into turnbuckle 158 and connects with a chain 161. The effective length of chain 161 is thereby easily regulated. A keeper 162 is secured to the outer end of chain 161 and is adapted to be removably disposed in a seat or saddle-like member 163 consisting of a pair of spaced plates secured to the outer end of above-mentioned lift arm 24 and which have cam surfaces 164 constituting a keeper-receiving recess of such shape that keeper 162 can be lodged on the surfaces 164, chain 161 depending therefrom between said spaced plates as clearly apparent in Figs. 1 and 2. Surfaces 164 are of such shape as to retain keeper 162 in normal operation of the device and during upward swinging of arm 24 so that such movement takes up the slack in chain 161 and lifts plow frame 134 through rod 155 and spring 157 as hereinbefore described. The recess formed by cam surfaces 164, however, is shallow enough so that in the event that the plow is released from the tractor, as in case of hitting an obstruction, keeper 162 will, upon the resulting rearward angling of chain 161 will slip out of the recess, off of cam surfaces 161, and thus release this part of the plow completely from the tractor.

The implement assembly may be substantially balanced about pin 151 so that it will remain approximately level when lifted, but if there is any tendency for it to tilt in any direction when lifted this is resisted or overcome by arms 44 and 46, as will appear.

Side plates 165 and 166 are attached as by bolts 167—167, respectively to beams 137 and 135 substantially at the forward ends thereof, depending therefrom and carrying outwardly extending studs 172 and 174 respectively, said studs being provided with heads 176—176 to prevent excessive sideward displacement of the connected parts. Side plates 165 and 166 serve to connect beams 135 and 137 with a substantial spacing or cross bar 179 secured to plates 165 and 166 and having thereon collars 183 and 185, spaced apart along crossbar 179 and defining therebetween a hitch-engaging region 187. This region is adapted to be releasably engaged in the recess formed by the notch 90 and recess 86 in order to releasably couple the implement 12 to the tractor. The plow is propelled or drawn by engagement of keeper 87 with region 187 of cross bar 179, plates 165 and 166 being rugged enough to transmit the very considereable forces involved to beams 136 and 137, the plow then working in many respects in a manner similar to plows of well-known construction, coulters 146 and 149 cutting a path for bottoms 136 and 138 which travel partially beneath the surface and turn the soil, the landside pressure being largely taken by the furrow wheel 139 traveling in the last furrow. As is well-known, plows of this general nature are sensitive to, and effectively regulated by adjustment of the hitch point, and in the present instance the landing adjustment is accomplished in this manner.

Collars 183 and 185 are shiftable along cross bar 179 to change the location of region 187, and have rearwardly extending guiding tongues 188 and 190 respectively between which portion 88 of coupling device 87 is retained when in operative position. Collar 183 is split forwardly of cross bar 179 and has flanges 192—192 clamped together by a fastening means or bolt 194, collar 185 having a similar flange 196 (broken away in Fig. 6), and by means of which flanges, collars 183 and 185 may be clamped in position on bar 179.

Region 187 is adjusted to receive keeper 88 between guiding tongues 188 and 190 with only sufficient clearance for free oscillating and disengaging movement of keeper 88. Furthermore, both collars 183 and 185 may be set to the left or right to define a new position for region 187, or in other words, for the point of attachment of keeper 88 to plow 12. Shifting this point to the right will cause the plow to travel more to the left, while shifting it to the left will cause the plow to travel more to the right, as will be understood by those skilled in the art, and thus cause the plow to cut a wider, or a narrower slice, as the case may be, or to take more or less land.

Plowing depth, in plows of known construction is commonly determined in general by the height of the hitch point, the plow traveling at a depth where the upward component of the draft pull exactly balances the weight and "suck" (or tendency to go deeper) of the plow. A relatively long drawbar or beam is commonly used and its hitch point on the tractor is raised or lowered by suitable mechanism whereupon the plow, when running, promptly finds a depth where the above described balance of forces is in effect. If anything disturbs this depth the plow will immediately restore it as soon as the disturbance is passed. Such long drawbars are inconvenient to accommodate on the tractor and would make difficult or impossible the quick reattachment of a plow which had broken away when hitting an obstruction. In the present arrangement, the drawbar is very short, being represented by the members 80 and 84 and would not operate with the plow in the manner just explained. However by virtue of the arms 44 and 46, it is not necessary or desirable that the drawbar be long or that it have provision for height adjustment. Arms 44 and 46, with their rearwardly bifurcated ends 198 and 200, respectively, engaging studs 174 and 172, and being adjustably and yieldingly fixed in relation to the tractor are readily adjusted to influence the plow by pressing upwardly or downwardly thereon to thereby introduce a component of force which, combined with whatever upward or downward components may already exit, will cause the plow to find and maintain the desired depth of operation. Furthermore, if the plow tends to tilt to one side or the other, upward or downward pressure is readily applied to one or the other side of the plow by suitable adjustment of arms 44 and 46 by means of levers 60 and 79 as hereinbefore explained.

It being normal for the tractor to run with one transaction wheel in the last previously formed furrow, it is usually necessary to adjust the right hand arm 44 to a higher position in relation to the tractor than left hand arm 46 so that as the tractor tilts the plow will run level. It is also noteworthy that the degree of tilting will be different for each different plowing depth, after the outfit has made at least one round of the field being plowed, and that any necessary adjustment, either up or down or side to side is made with the greatest of ease by means of arms 44 and 46 controlled by levers 60 and 79. Thus assuming a predetermined plowing depth and a predetermined tilt of the tractor, the plow running level, and that it is desired to plow at a greater depth, it is only necessary to adjust levers 60 and 79 backwardly the required distance, thus lowering the bifurcated portions 198 and 200 of arms 44 and 46, the tractor running with one wheel in the old shallow furrow and the relative tilt between the plow and tractor remaining the same. This condition will continue for one circuit around the field or land, or until the tractor comes to the place where the furrow was deepened. Here the tractor will assume a greater tilt and, in order to keep the plow running level lever 60 can be adjusted forwardly, thus raising the bifurcated portion 198 of arm 44 relatively to the tractor but in fact restoring it to the same level above the ground which it occupied previous to the encountering of the deeper furrow by the tractor. The plow will then continue running level at the new depth, while the tractor will assume a greater tilt.

Sufficient freedom is provided within cutaway portions 86 and 90 about cross bar 179 so that such tilting movements are readily accommodated.

Portion 84 may rise and fall about pivot 85 to provide for up and down movement of cross bar 179 in response to the urging of arms 44 and 46, or because of relative movement of the plow and tractor caused by rough ground. Also up and down movement of cross bar 179 is accommodated by sliding movement on the substantially vertical surface 202 of keeper 88.

The backward pull, or reaction of the plow against surface 202 causes a forward thrust against pivot 92 which, because of the slight misalignment of pivots 92, 95 and 98, causes an upward resultant in pivot 95. This upward resultant is resisted by spring 103 acting as hereinbefore explained to hold arms 99 and 100 yieldingly together, the force of the spring being substantially in excess of that necessary to hold the parts in position against any force developed by normal plowing operations. However if the plow encounters an immovable obstruction the upward force in pivot 95 becomes large enough so that arms 99 and 100 separate slightly, further compressing spring 103. This increases the angle defined by pivots 92, 95 and 98 to such an extent that further upward displacement of pivot 95 is effected without substantial further increase in the force against surface 202, keeper 88 tilting rearwardly about pivot 89 until its position is such (dotted lines in Fig. 5) that it rides over cross bar 179 which latter thus escapes from cut-away portions 86 and 90 and relieves all the parts from excessive stress.

Tractor 10, of course, keeps moving for a short time at least, arms 44 and 46 slipping off of studs 174 and 172 and cam surface 164 sliding out from under keeper 162. Thus plow 12 is automatically and completely released from tractor 10 when it hits an obstruction, even though it is normally carried on and propelled by the tractor.

When the tractor has been stopped, after such release it is merely necessary to back the tractor into position, adjust levers 60 and 79 (if necessary) to assure alignment of bifurcated portions 198 and 200 with studs 174 and 172, raise keeper 88 pivotally about pivot 85 by means of rope 108 and continue to back until studs 174 and 172 enter bifurcated portions 198 and 200. Keeper 88 is then lowered behind cross bar 179 by releasing rope 108 and keeper 162 is readily manually placed on cam surfaces 164 whereupon the outfit is again ready for use.

It will ordinarily be necessary to back the plow slightly, arms 44 and 46 pressing against studs 174 and 172, so as to free it from the obstruction. Power lift arm 24 is then actuated so as to pull on chain 161 and raise plow 12 by means of pin 151, plow 12 being guided and stabilized by continued engagement of cross bar 179 with cut-away portions 86 and 90 and by engagement of arms 44 and 46 with studs 174 and 172. The tractor is then driven forwardly and power lift arm 24 lowered whereupon bottoms 136 and 138 again enter the ground and levers 60 and 79 are adjusted to restore the plow to the previous plowing depth and to level it. The first forward movement of tractor 10 causes keeper 88 to be guided by tongues 188 and 190 into contact with region 187.

The operation of picking up plow 12 by means of power lift arm 24 and chain 161 is cushioned by spring 157 within housing 153, rod 155 applying the lifting force to spring 157 and sliding within housing 153 as the spring yields.

Figure 2:
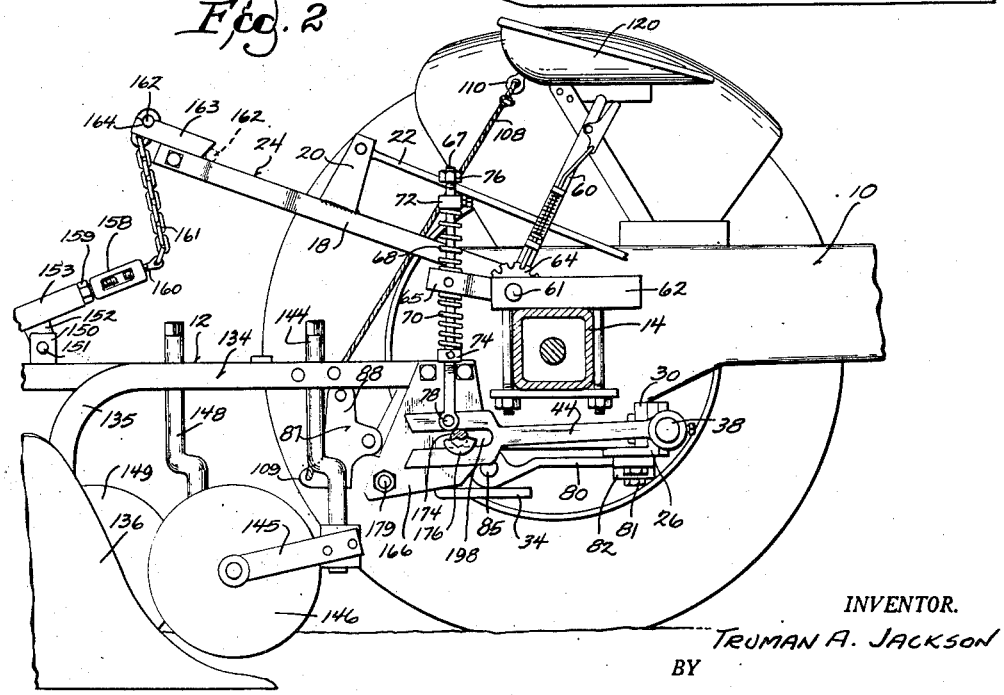
Figure 2 is a sectional view taken substantially on the line 2—2 of Figure 1 and in the direction of the arrows.

As a precaution if plow 12 is to be transported an appreciable distance, keeper 162 may be placed forwardly of saddle-like member 163 as seen in dotted lines in Fig. 2, thereby providing against any possibiltiy of release of keeper 162 inadvertently, as under extreme rough riding conditions.

It will be noted, that in plowing position as seen in Fig. 2, studs 174 and 172 occupy an intermediate position along the length of bifurcated portions 198 and 200 of arms 44 and 46. Thus it is practical for tractor 10 to turn at a reasonable angle to plow 12 without either stud encountering the closed end of either bifurcated portion. The outfit is therefore extremely adaptable to contour plowing in which the furrows are plowed along easy curves so that they follow around the sides of the hills thus avoiding any upward or downward inclination. Difficulty has heretofore been experienced in this kind of plowing when attempted with known forms of mounted plows. Commonly when the tractor swings to the right, the plow swings to the left and takes too much land and vice versa. This difficulty is avoided by the present construction. However if by reason of inexperience or other inadvertence, the tractor is turned so sharply as to result in danger of contact of any part of the plow with one of the traction wheels, one of the studs (174—172) whichever is on the side which is endangered, will encounter the end of its associated bifurcated portion and tend to swing the plow with the tractor. This is substantially impossible with the plow in the ground and results in a greatly increased pull on keeper 88. In fact the pull is so great that keeper 88 will release in the manner above described as when the plow hits an obstruction, the plow then being released from the tractor without danger or damage. As will be apparent, this action takes place whether the tractor is turned excessively to the right or to the left.

The length of chain 161 is readily adjusted by manipulation of turnbuckle 158 in a manner which will be clear to one skilled in the art. Springs 68 and 70 may be adjusted to result in any desired characteristics as regards response to lever 60 and the corresponding parts associated with lever 79 are similarly adjustable. If the plow takes too much land collars 183 and 185 are readily loosened and shifted slightly to the left along cross bar 179. On the other hand if it takes too little, they are adjusted to the right, being clamped of course in all cases solidly in their new positions.

As will be apparent, plow 12 may be released from tractor 10 at any time by merely resting it on the ground, pulling rope 108 and driving away, whereupon it will be completely released from the tractor in a manner identical to that wherein it is released upon striking an obstruction and it will be noted that the parts remaining on the tractor are not a serious encumbrance and that the tractor may be readily used for other purposes without removing these attached parts. The plow can be just as readily picked up by merely backing into place, placing keeper 162 on cam surfaces 164 and dropping keeper 88 behind cross bar 179.

It is thought to be apparent that a structure has been provided which will amply accomplish the objects set forth in the beginning of this description and what is claimed as new and desired to be secured by Letters Patent of the United States is:

1. In a tractor mounted plow the combination of a tractor having a rear axle, a plow, a pivotal connection between the tractor and the plow at a level below said rear axle and releasable upon attainment of a predetermined load, providing for sideward swinging movement between the tractor and plow, and a pair of guiding connections spaced laterally on either side of the pivotal connection at a level below said rear axle and adjustable up and down to effect leveling of the plow, said guiding connections being constituted to separate upon relative longitudinal movement between the tractor and plow in one direction and each including a pin and slot engagement between the guiding connection and the plow, the slots being of a length such that the pin on one guiding connection will encounter the end of its respective slot upon excessive turning of the tractor so that said predetermined load will be applied to said pivotal connection to cause release of the plow in the event of such excessive turning.

2. In a tractor mounted implement the combination of a pair of vertically spaced attaching devices connecting said implement to said tractor, the lower of said devices being constituted to draw said implement but to release it upon the occurrence of excessive draft force therein, and the other comprising a lifting arm, a tension member connected between said lifting arm and said implement to transmit an upward lifting force to said implement but disengageable upon the occurrence of substantial rearward angular pull by the implement subsequent to release of said device constituted to draw said implement, a housing on said implement, a compression spring in the housing and a connection from said spring extending outside of the housing and connected with said tension member.

3. In combination a tractor having a rear axle, a hitch substantially centrally disposed on the tractor at a level below the axle, said hitch including an overload release, a soil working implement disposed in trailing relation with said tractor and including a portion pivotally engaged with said centrally disposed hitch, implement influencing means spaced at either side of said hitch at a level beneath said axle constituted to exert resilient downward pressure on said implement, a pin and slot connection between each of said influencing means and said implement, the slots being open in a direction such that the connection may be broken by relative movement of said tractor and implement in one direction in the normal path of travel of said tractor, and said influencing means having adjusting mechanism constituted to be operable to cause said influencing means to exert resilient upward pressure on said implement.

(References on following page)

References Cited in the file of this patent

UNITED STATES PATENTS

| | | | |
|---|---|---|---|
| 1,369,980 | Natterstade | Mar. 1, | 1921 |
| 1,372,611 | Dill | Mar. 22, | 1921 |
| 2,140,144 | Silver | Dec. 13, | 1938 |
| 2,358,298 | Benjamin | Sept. 19, | 1944 |
| 2,368,266 | Silver | Jan. 30, | 1945 |
| 2,369,436 | Court | Feb. 13, | 1945 |
| 2,369,437 | Court | Feb. 13, | 1945 |
| 2,476,439 | Court | July 19, | 1949 |
| 2,482,657 | Court | Sept. 20, | 1949 |
| 2,505,609 | Ego | Apr. 25, | 1950 |
| 2,562,817 | Pethick | July 31, | 1951 |

FOREIGN PATENTS

| | | | |
|---|---|---|---|
| 335,571 | Germany | Apr. 8, | 1921 |
| 345,903 | Germany | Dec. 20, | 1921 |
| 993,537 | France | July 25, | 1951 |